(12) United States Patent
Austbo et al.

(10) Patent No.: US 6,892,809 B2
(45) Date of Patent: May 17, 2005

(54) COILED TUBING INJECTOR APPARATUS

(75) Inventors: Larry L. Austbo, Duncan, OK (US);
Randy S. Rosine, Duncan, OK (US);
Robert E. Domann, Duncan, OK (US);
Kenneth C. Parks, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/780,079

(22) Filed: Feb. 17, 2004

(65) Prior Publication Data

US 2004/0159443 A1 Aug. 19, 2004

Related U.S. Application Data

(62) Division of application No. 10/143,469, filed on May 10, 2002, now Pat. No. 6,719,043.

(51) Int. Cl.[7] .............................................. E21B 19/22
(52) U.S. Cl. ...................... 166/77.3; 166/385; 226/173
(58) Field of Search ................................ 166/365, 77.2, 166/77.3, 379, 384, 242.2, 85.5, 85.1; 226/172, 173

(56) References Cited

U.S. PATENT DOCUMENTS

| | | | | |
|---|---|---|---|---|
| 2,567,009 A | * | 9/1951 | Calhoun et al. ........... | 166/77.3 |
| 3,559,905 A | * | 2/1971 | Palynchuk ............... | 242/390.5 |
| 5,094,340 A | | 3/1992 | Avakov ................... | 198/626.1 |
| 5,234,053 A | | 8/1993 | Connell ................... | 166/250 |
| 5,553,668 A | | 9/1996 | Council et al. ............ | 166/77.3 |
| 5,853,118 A | | 12/1998 | Avakov ................... | 226/173 |
| 6,209,634 B1 | * | 4/2001 | Avakov et al. ............ | 166/77.3 |
| 6,230,955 B1 | | 5/2001 | Parks ..................... | 226/190 |
| 6,382,322 B1 | * | 5/2002 | Gipson ................... | 166/379 |

* cited by examiner

Primary Examiner—Kenn Thompson
(74) Attorney, Agent, or Firm—John W. Wustenberg; Anthony L. Rahhal

(57) ABSTRACT

A coiled tubing injector apparatus for use in inserting coiled tubing into a well, temporarily suspending the coiled tubing, and removing the coiled tubing from the well is described. The apparatus includes a base with a pair of spaced-apart carriages extending upwardly therefrom. The base is part of a frame positioned above a wellhead. The carriages each have a gripper chain drive system rotatably mounted thereon and movable therewith. An actuation and linkage system allows the carriages to move toward and away from one another in a lateral or transverse direction with respect to the superstructure and the base. Thus, the gripper chain systems comprises gripper chains that can be engaged or disengaged from the coiled tubing extending through the apparatus. A wetting fluid basin is positioned below the gripper chains, and support guides engage the coiled tubing below the gripper chains to prevent buckling of the coiled tubing. The gripper chain drive system includes idler sprockets mounted on an idler sprocket shaft. The position of first and second ends of the idler sprocket shaft are monitored, and may be adjusted to maintain a parallel relationship with a drive sprocket shaft on which are mounted drive sprockets supporting the gripper chain.

12 Claims, 15 Drawing Sheets

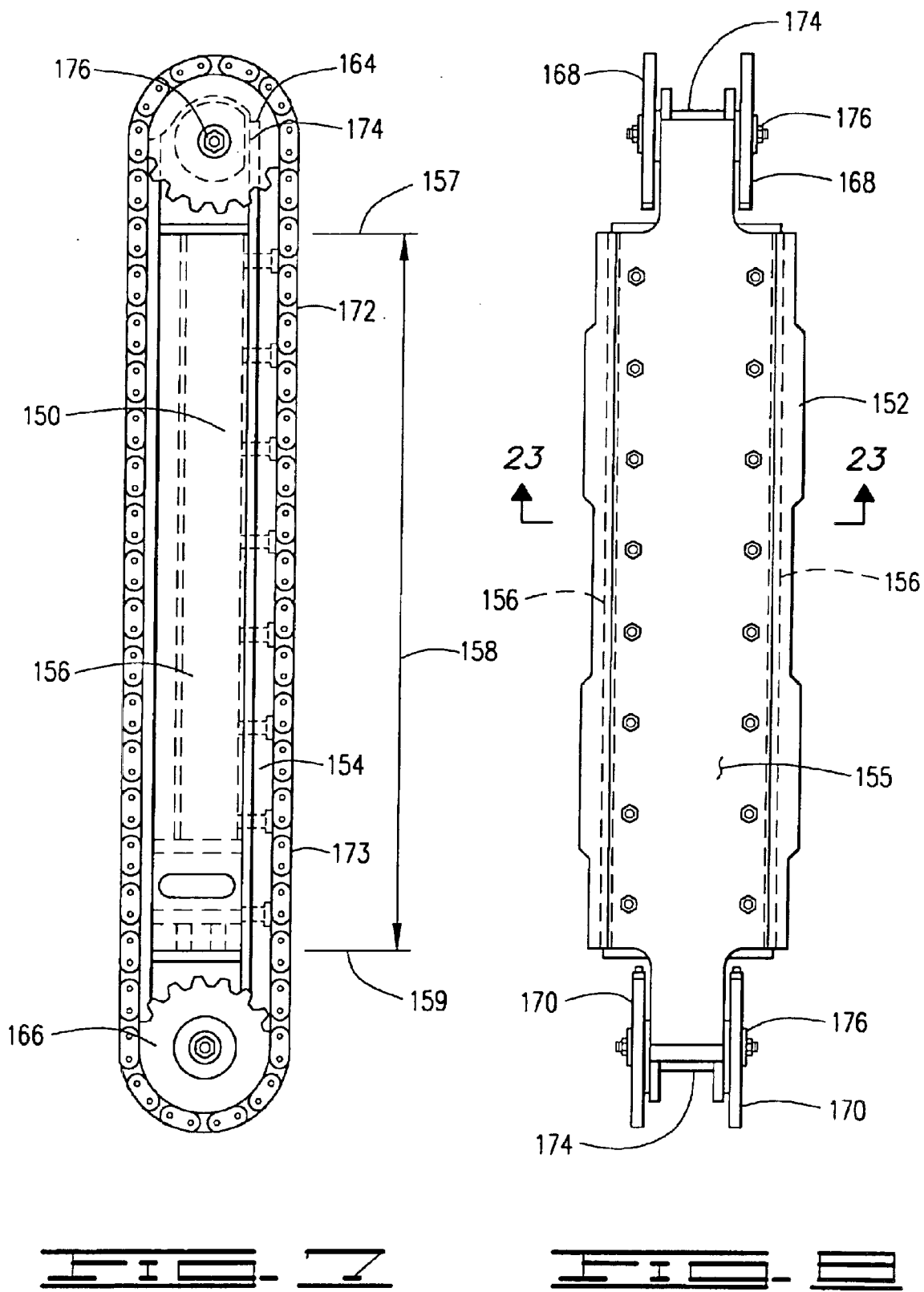

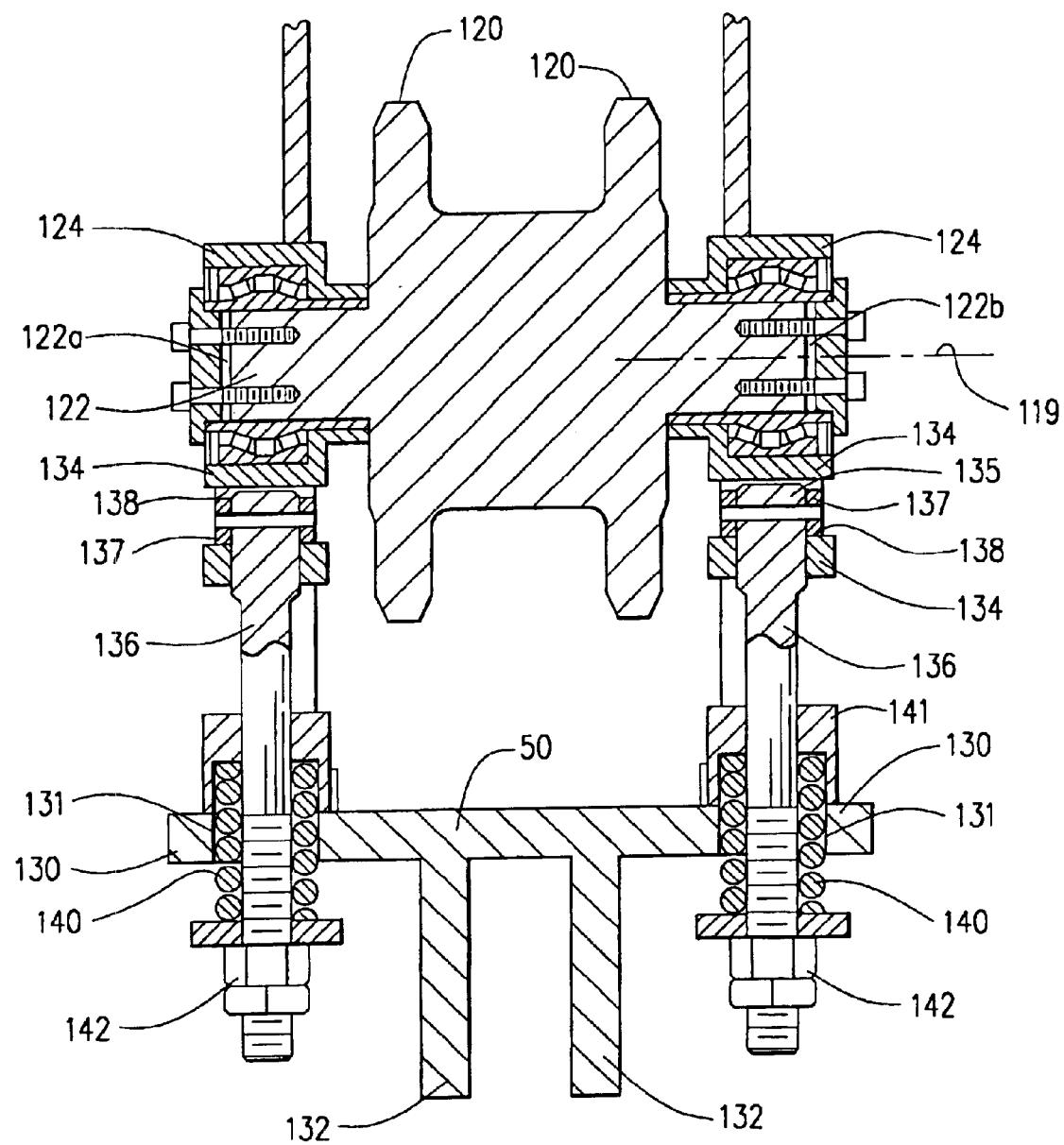
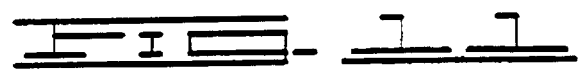

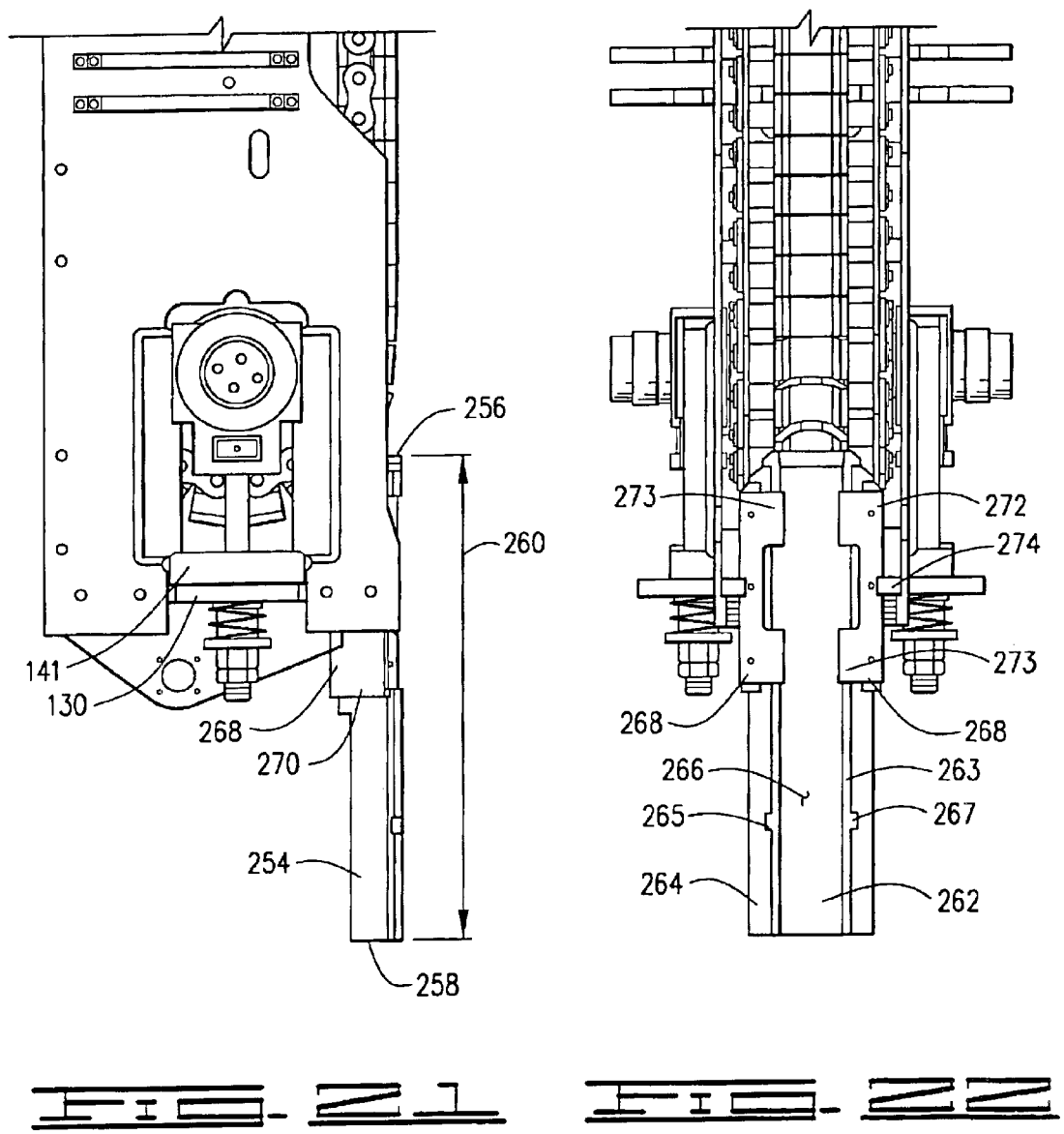

COILED TUBING INJECTOR APPARATUS

CROSS-REFERENCE TO RELATED APPLICATION

This application is a divisional of application Ser. No. 10/143,469 filed May 10, 2002 now U.S. Pat. No. 6,719,043.

BACKGROUND

After a well has been completed to produce oil or gas, it is necessary to periodically service the well. There are many occasions when the service procedure is carried out using coiled tubing. Such tubing is inserted into the wellhead through a lubricator assembly or stuffing box. Typically, this is necessary because there is a pressure differential at the surface of the well and the atmosphere, which may have been naturally or artificially created, that serves to produce oil or gas or a mixture thereof from the pressurized well. The tubing that is inserted into the well is normally inserted through a lubricator mechanism which provides a seal about the O.D. of the tubing for the retention of any pressure that may be present at or near the surface of the well. The tubing is inserted by a coiled tubing injector apparatus which generally incorporates a multitude of gripper blocks for handling the tubing as it passes through the injector. The tubing is flexible and can therefore be cyclically coiled onto and off of a spool, or reel, by the injector which often acts in concert with a windlass and a power supply which drives the spool, or reel.

The injector utilizes a pair of opposed endless drive chains which are arranged in a common plane. These opposed endless drive chains are often referred to as gripper chains because each chain has a multitude of gripper blocks attached therealong. The gripper chains are driven by respective drive sprockets which are in turn powered by a reversible hydraulic motor. Each gripper chain is also provided with a respective idler sprocket to maintain each gripper chain within the common plane. Both the drive sprockets and idler sprockets are mounted on a common frame wherein the distance between centers of all the sprockets are essentially of a constant distance from each other. That is, the drive sprockets are free to rotate, but are not free to move either vertically or laterally with respect to each other. The idler sprockets are not free to move laterally with respect to each other, but are vertically adjustable within a limited range in order to set the amount of play in each gripper chain. Such vertical adjustment is made by either a mechanical adjusting means or a hydraulic adjusting means. Typically, for injectors having mechanical adjustment means, the adjustment is made when the injector is not in operation.

The opposed gripper chains, preferably via the gripper blocks, sequentially grasp the tubing that is positioned between the opposed gripper chains. When the gripper chains are in motion, each gripper chain has a gripper block that is coming into contact with the tubing as another gripper block on the same gripper chain is breaking contact with the tubing. This continues in an endless fashion as the gripper chains are driven to force the tubing into or out of the wellbore, depending on the direction in which the drive sprockets are rotated. Gripper blocks such as those set forth in U.S. Pat. No. 5,094,340, issued Mar. 10, 1992, to Avakov, which is incorporated herein by reference, may be used.

The gripper chain is provided with a predetermined amount of slack which allows the gripper chain to be biased against the tubing to inject the tubing into and out of the wellbore. This biasing is accomplished with an endless roller chain disposed inside each gripper chain. Each roller chain engages sprockets rotatably mounted on a respective linear bearing beam, referred to herein as a linear beam. A linkage and hydraulic cylinder mechanism allows the linear beams to be moved toward one another so that each roller chain is moved against its corresponding gripper chain such that the tubing facing portion of the gripper chain is moved toward the tubing so that the gripper blocks can engage the tubing and move it through the apparatus. The gripper blocks will engage the tubing along a working length of the linear beam.

Each gripper chain has a gripper block that contacts the tubing at the top of the working length as a gripper block on the same chain is breaking contact at a bottom of the working length of the linear beam.

The fixed distance between each set of drive sprockets and idler sprockets requires some significant lateral movement in the gripper chain when engaged by the roller chain on the corresponding linear beam in order to allow the gripper chains to engage the tubing by way of the gripper blocks. The reason for having the requisite amount of lateral play in the gripper chains is to provide a limited amount of clearance between the gripper chains, upon moving the respective roller chains away from the vertical centerline of the injector, to allow the passage of tubing and tools having larger outside diameters or dimensions. One shortcoming in this design is that the required slack can often cause misalignment problems and even binding problems with the gripper chains due to having to accommodate ever increasing outside nominal dimensions of downhole tools and wellhead equipment.

There are, within the art, injectors that can accommodate a variety of outside diameters of tubing while avoiding: chain misalignment, chain binding tendencies, improper chain tension, gripper block marking or gouging, and other inherent design problems of prior injectors which manifest themselves when working with tubing, tools, and surface equipment having large nominal outside diameters. Examples of such injectors are disclosed in U.S. Pat. No. 5,553,668, issued Sep. 10, 1996, to Council et al., and U.S. Pat. No. 6,209,634, issued Apr. 3, 2001, to Avakov et al., both of which are incorporated herein by reference and assigned to the assignee of the present invention.

There are, however, other difficulties that are faced when utilizing an injector to inject, suspend, or extract tubing from a wellbore. During operation of an injector, the idler sprockets may move, so that the centerline of the idler sprocket moves relative to the centerline of the drive sprocket, and may no longer be parallel to the centerline of the drive sprocket. There is a need for an apparatus that will allow the distance between the drive sprockets and the idler sprockets to be monitored and verified.

Generally, as provided herein, the wellbore in which the tubing is injected will be pressurized, so that as the tubing is initially inserted through the injector and into the wellbore, the pressure will tend to resist injection of the tubing. The pressure in the well attempts to push the tubing upwardly as the tubing is being injected, which causes buckling forces to be applied to the tubing between the lower end of the working length of the gripper chain and the point at which the tubing is engaged in the stuffing box or lubricator. Further, the tubing should be lubricated prior to entering the stuffing box. Presently, a wetting fluid is manually applied to the tubing after the tubing is spooled off the reel and prior to the time the tubing is engaged by the injector. Manual application of wetting fluid can be hazardous to the environment, due to the nature of the wetting fluids that may be used, and may be dangerous to the workers applying the fluid.

It is also important that as the downward forces are applied to the tubing by the gripper chains and the gripping loads are applied to the tubing, the gripper chains remain parallel to one another, and resist transverse movement. If the gripper chains move sideways relative to one another, the result can be less gripping force, and damage to the tubing and the injector.

SUMMARY

The present invention is directed to a coiled tubing injector apparatus for use in inserting coiled tubing into a well, temporarily suspending the tubing in the well, and for extracting tubing from the well. The injector generally comprises a base, a carriage extending upward from the base, and a gripper chain drive system mounted in the carriage. The base is mounted on legs, or a superstructure, and is positioned above a wellhead.

The carriage may be pivotally attached to the base, and is preferably laterally movable with respect to the base. The gripper chain drive system is movable with the carriage, and is adapted to engage tubing extending through the superstructure. The carriage is preferably one of a pair of spaced carriages which may be pivotally attached to and laterally movable with respect to the base. The tubing will pass between the spaced carriages and through the base along a preselected centerline, so that the tubing will pass between and be engaged by the gripper chain drive systems when the carriages are moved toward one another.

The base has a pair of attachment lugs extending upwardly therefrom. The attachment lugs will mate with corresponding carriage lugs located at a lower end of the carriages. The carriages are attached to the base with a load pin extending through the attachment lugs and corresponding carriage lugs. The attachment lugs are slidably connected to the base, so that the carriages are laterally movable with respect to the base and each other.

The gripper chain drive system comprises a drive shaft mounted on the carriage, drive sprockets mounted on the drive shaft, an idler shaft mounted on the carriage, and idler sprockets mounted on the idler shaft. A gripper chain which includes a plurality of gripper blocks attached thereto engages the drive and idler sprockets.

A roller chain system for supporting the gripper chain when it engages the tubing is also included. The roller chain system is mounted on a pressure, or linear beam that is rigidly positioned in the carriage. The roller chain system includes an upper mounting shaft mounted on the linear beam, an upper roller sprocket mounted on the upper mounting shaft, a lower mounting shaft mounted on the linear beam, a lower roller sprocket located on the lower mounting shaft, and a roller chain engaged with the upper and lower roller sprockets. Each linear beam has a working length defined thereon to support the gripper chain. When the carriages are moved so that the gripper chains engage the tubing, the gripper chain will engage the tubing along the working length of the linear beam, and a corresponding working length of the gripper chain. In one embodiment of the invention, the linear beam may have a raised face, and the roller chain may be notched, to limit lateral movement of the roller chain with respect to the linear beam, and to limit lateral movement of the gripper chain with respect to the roller chain.

The injector includes a means for moving the carriages laterally, which may comprise a plurality of hydraulically actuated gripper cylinders. When the gripper cylinders are actuated to move the carriages toward one another, the gripper chains will engage the tubing. The injector includes a pair of support guides attached to and movable with the carriages. The support guides engage the tubing below the lower end of the working length of the gripper chain, and have a length sufficient to resist buckling loads. The support guides preferably span substantially the distance between the lower end of the working length and the exit of the base of the injector. The support guides preferably are comprised of an ultrahigh molecular weight material, and have a profile that matches the profile of the gripper blocks.

The injector includes a wetting fluid basin through which the tubing passes prior to entering the stuffing box. The basin is positioned below the lower end of the working length of the gripper chain, and is preferably defined at least partially by the base of the injector.

BRIEF DESCRIPTION OF THE DRAWINGS

FIG. 6 shows a view from line 6—6 of FIG. 3.

FIG. 7 shows a view of a linear beam.

FIGS. 11 and 12 show section views from lines 11—11 and 12—12, respectively, of FIG. 2.

FIGS. 21 and 22 show side and front views of the lower end of the carriages.

DESCRIPTION

Figure 1:
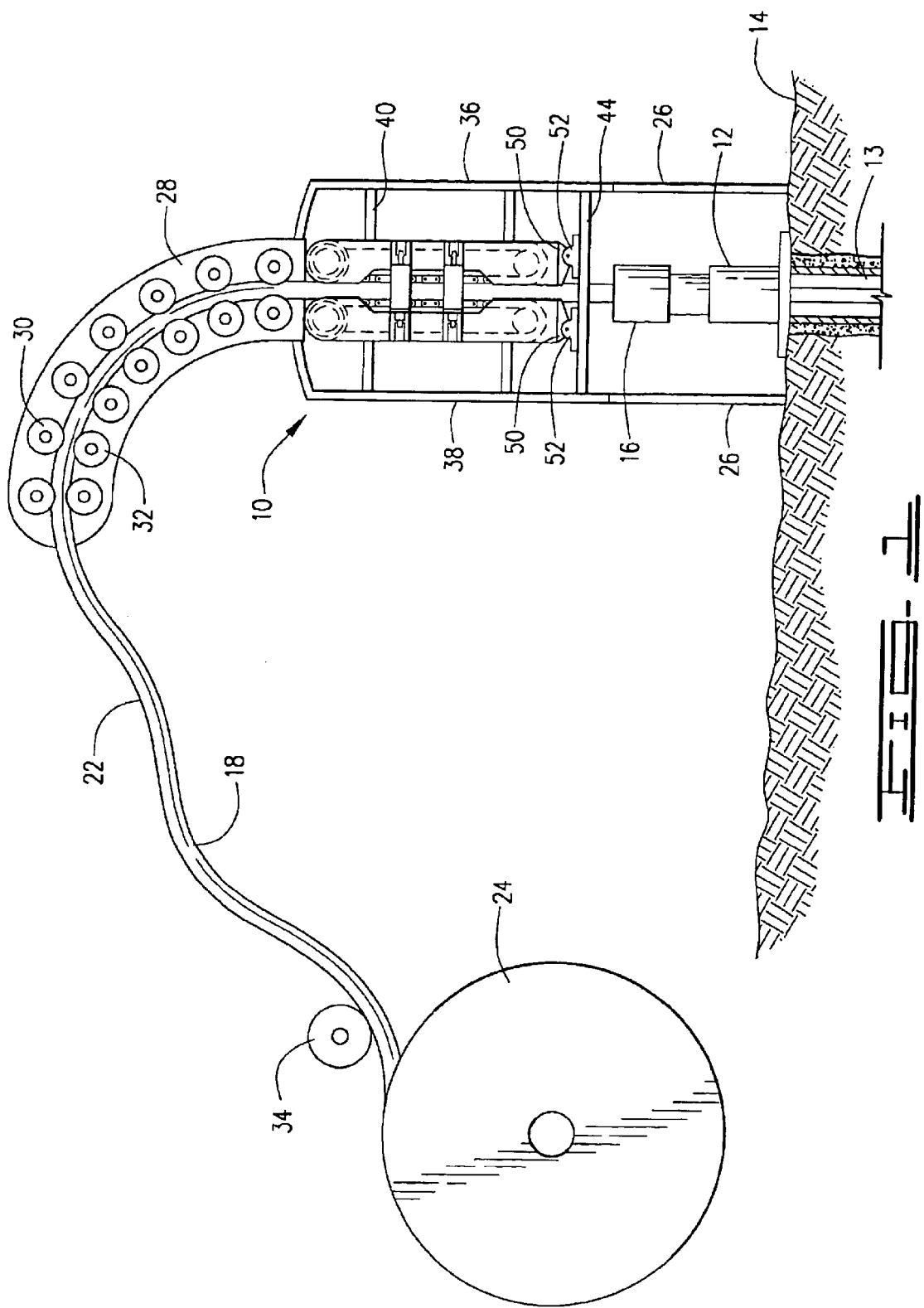
FIG. 1 schematically shows the coiled tubing injector apparatus of the present invention in position for inserting coiled tubing into an adjacent wellhead.

Referring now to the drawings, and more particularly to FIG. 1, the coiled tubing injector apparatus of the present invention is shown and generally designated by the numeral 10. Injector 10 is shown positioned above a wellhead 12 of a well 13 at a ground surface or subsea floor 14. A lubricator or stuffing box 16 is connected to the upper end of wellhead 12.

Tubing 18, having a longitudinal central axis 20 and an outer diameter or outer surface 22, is supplied on a large drum, or reel 24 and is typically several thousand feet in length. Tubing 18 of sufficient length, such as 10,000 feet or greater, may be inserted into the well 13 either as single tubing, or as tubing spliced by connectors or by welding. The outer diameters of the tubing 18 typically range from approximately one inch (2.5 cm) to approximately five inches (12.5 cm). The disclosed injector 10 is readily adaptable to even larger diameters. Tubing 18 is normally spooled from drum 24 typically supported on a truck (not shown) for mobile operations.

Injector 10 is mounted above wellhead 12 on legs 26. A guide framework 28 having a plurality of pairs of guide rollers 30 and 32 rotatably mounted thereon extends upwardly from injector 10.

Tubing 18 is supplied from drum 24 and is run between rollers 30 and 32. As tubing 18 is unspooled from drum 24, generally it will pass adjacent to a measuring device, such as wheel 34. Alternatively, the measuring device may be incorporated in injector 10, such as described in U.S. Pat. No. 5,234,053, issued Aug. 10, 1993, to Connell.

Rollers 30 and 32 define a pathway for tubing 18 so that the curvature in the tubing 18 is slowly straightened as it enters injector 10. As will be understood, tubing 18 is preferably formed of a material which is sufficiently flexible and ductile that it can be curved for storage on drum 24 and also later straightened. While the material is flexible and ductile, and will accept bending around a radius of curvature, it runs the risk of being pinched or suffer from premature fatigue failure should the curvature be severe. Rollers 30 and 32 are spaced such that straightening of the tubing 18 is accomplished wherein the tubing 18 is inserted into the well 13 without kinks or undue bending on the tubing 18. However, the disclosed injector 10 can be used for injecting, suspending, or extracting any generally elongated body. All of this is done in a manner known in the art.

Referring now to FIGS. 2–18, the details of injector 10 will be discussed. Injector 10 includes a frame 36. Frame 36 has legs 38, rear supports 40, and side supports 42. Injector 10 further comprises a base 44 which makes up a part of frame 36, and a pair of substantially similar carriages 46 extending upward therefrom. Each carriage 46 has a carriage lug 50 extending downward from a lower end thereof. The carriage lugs 50 mate with a pair of attachment lugs 52 which extend upwardly from base 44 and which are slidable relative thereto as explained more fully herein. FIG. 14 shows attachment lugs 52 which may include a lug base 54 having upper and lower surfaces 56 and 58, respectively, and an attachment portion 60 extending upward therefrom. A load pin 62, having a center or longitudinal central axis 64 extends through each carriage lug 50 and the corresponding attachment lug 52 so that the carriages 46 are pivotally attached to the base 44. The injector 10 also includes a means 66 for moving the carriages laterally with respect to one another and with respect to the base 44. The injector 10 has a front, or forward side 68, and a back, or rear side 70.

Figure 2:
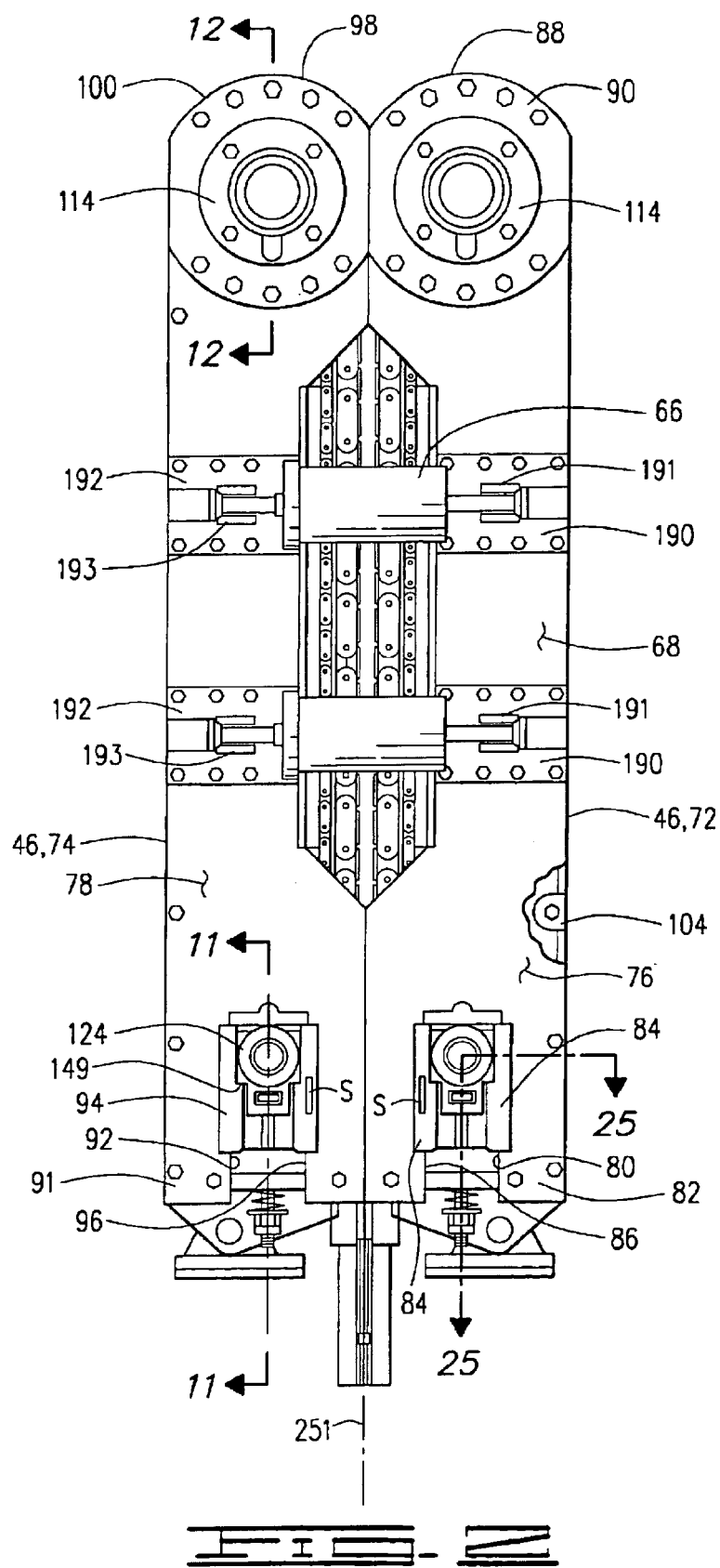
FIG. 2 shows a front view of the carriages of the injector of the present invention.
Figure 3:
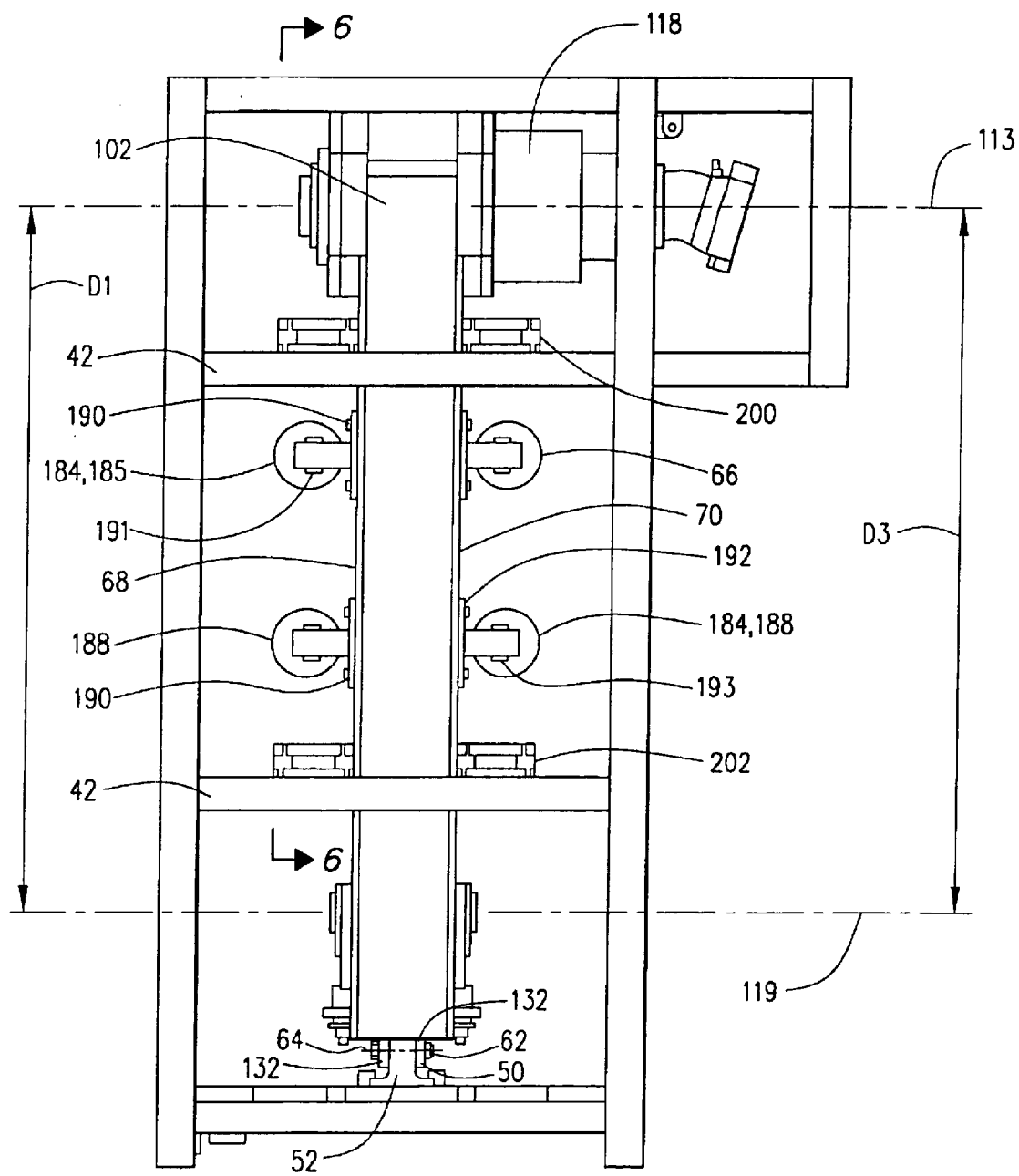
FIG. 3 shows a side view of the injector of the present invention.

Carriages 46 comprise a first or right side carriage 72 and a second or left side carriage 74. Carriages 72 and 74 will move towards and away from each other when means for moving 66 is actuated. Carriages 72 and 74 are substantially similar in that, as seen in FIG. 2, carriages 72 and 74 are mirror images of one another. Right side carriage 72 comprises first outer plate 76 and second outer plate 78. Outer plates 76 and 78 are mirror images of one another. First outer plate 76 may include a rectangular cutout 80 at or near a lower end 82 thereof. A pair of bosses 84 extend along the sides 86 of rectangular cutout 80. First outer plate 76 has a mounting boss 88 at an upper end 90 thereof.

Second outer plate 78, being a mirror image of first outer plate 76, likewise includes a rectangular cutout 92 at or near a lower end 91 thereof and a pair of bosses 94 extending downwardly along sides 96 of rectangular cutout 92. Second outer plate 78 has a mounting boss 98 at an upper end 100 thereof. First outer plate 76 is the forward outer plate of right side carriage 72 and second outer plate 78 is the rear outer plate. Because outer plates 76 and 78 are mirror images, and because right and left side carriages 72 and 74, respectively, are mirror images, the forward outer plate of left side carriage 74 is substantially identical to, and may be comprised of, second outer plate 78, which is the rear outer plate of right side carriage 72. Likewise, the rear outer plate of left side carriage 74 is substantially identical to, and may be comprised of, first outer plate 76. A back plate 102 is connected to outer plates 76 and 78. Back plate 102 may be connected using bolts or other means known in the art. For instance, as shown in FIG. 2, the back plate 102 may have lugs 104 extending inwardly therefrom so that bolts extending through the outer plates 76 and 78 may be attached thereto.

Figure 4:
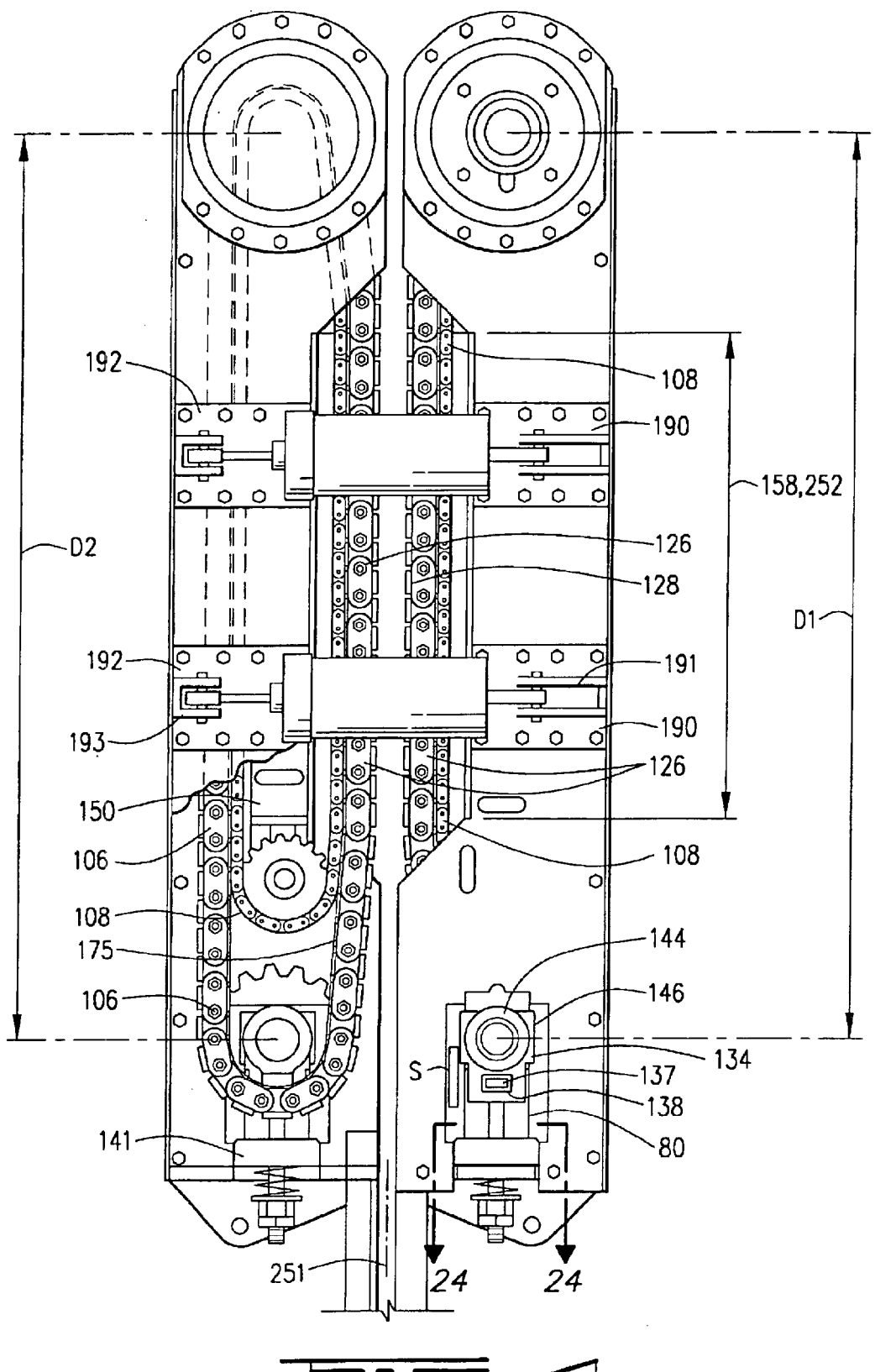
FIG. 4 shows a partial front view and a partial cross section of the carriages with a portion of the outer plate removed.
Figure 5:
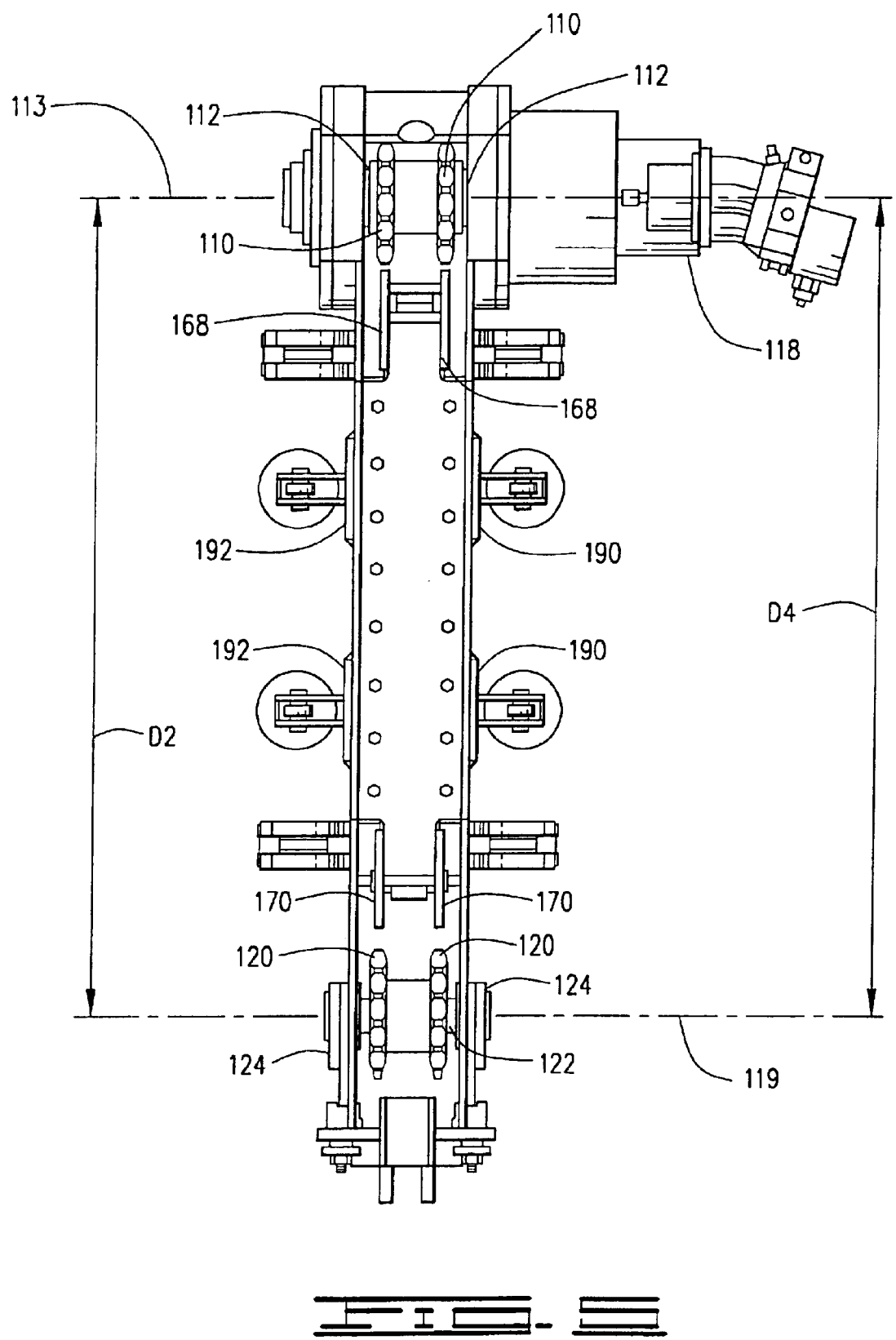
FIG. 5 shows a partial schematic looking at the inner side of a carriage from the center of the injector with the gripper and roller chains removed.
Figure 12:
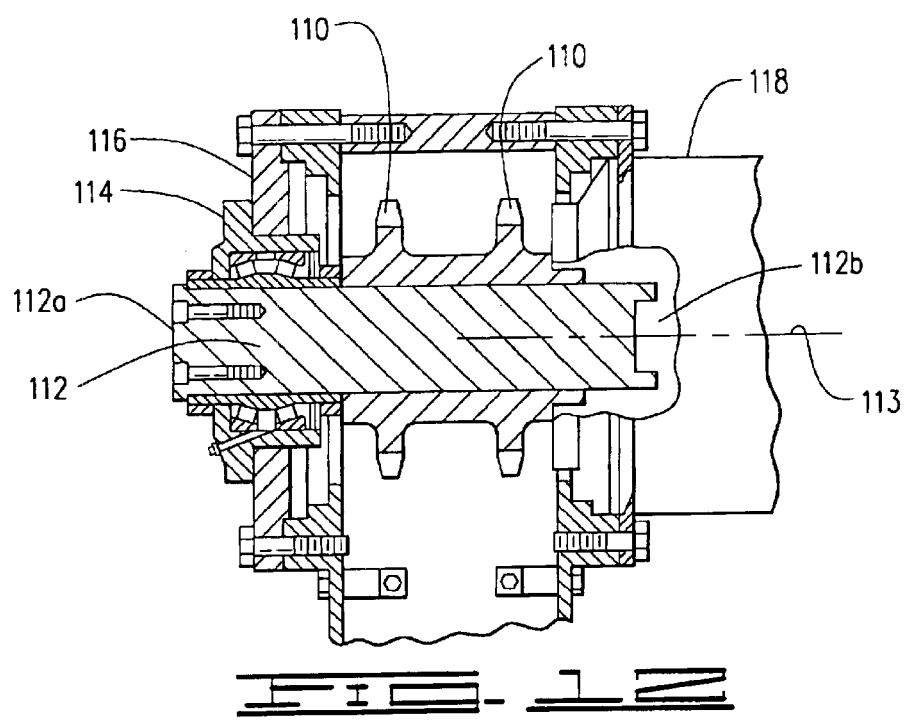

Each carriage 46 also includes a gripper chain drive system 106 and a roller chain drive system 108. Referring to FIGS. 4 and 5, gripper chain drive system 106 includes a pair of spaced gripper chain drive sprockets 110 rotatably disposed in the carriage 46. Drive sprockets 110 are mounted on a drive sprocket shaft 112 having a centerline, or longitudinal central axis 113 corresponding to, or collinear with, an axis of rotation of the drive sprockets 110. As better seen in FIG. 12, drive sprocket shaft 112 extends through the mounting boss on the forward side 68 of the injector 10 and into a flanged bearing 114. A bearing adapter 116 is also included and is attached to the mounting boss, which in FIG. 12 is mounting boss 98. The drive sprockets 110 are driven by a reversible hydraulic motor 118 attached to each carriage 46 on the back side 70 of the injector 10. Hydraulic motor 118 is of a type known in the art and is driven by a planetary gear and has an integral brake. Thus, hydraulic motor 118 can inject, retract, or suspend tubing 18 in the well 13. Drive sprocket shaft 112 may be keyed or otherwise connected to drive sprockets 110, so that rotation of drive sprocket shaft 112 will rotate drive sprockets 110.

Gripper chain drive system 106 also includes a pair of spaced gripper chain idler sprockets 120 which are rotatably disposed in the lower end of each carriage 46. Idler sprockets 120 are mounted on idler sprocket shaft 122, having a centerline, or longitudinal central axis 119 corresponding to, or collinear with, an axis of rotation of the idler sprockets 120. In the embodiment shown, the idler sprocket shaft 122 and idler sprockets 120 are one piece. However, idler sprocket shaft 122 may be keyed or otherwise connected to idler sprockets 120 so that idler sprocket shaft 122 and idler sprockets 120 will rotate together. As best seen in FIG. 11, gripper chain tensioners 124 are connected to the opposite ends of idler sprocket shaft 122. Tensioners 124 are mounted on bosses 84 and 94 of first outer plate 76 and second outer plate 78, respectively. Tensioners 124 are mounted so that they can be vertically adjusted within rectangular cutouts 80 and 92. A gripper chain 126 is engaged with drive sprockets 110 and idler sprockets 120 in each carriage 46. Gripper chain 126 may be of a kind known in the art and has a plurality of outwardly facing gripper blocks 128 disposed thereon.

Gripper blocks 128 are adapted for engaging tubing 18 and moving it through injector 10. Gripper blocks 128 may be like those set forth in U.S. Pat. No. 5,853,118, issued Dec. 29, 1998, to Avakov or U.S. Pat. No. 6,230,955, issued May 15, 2001, to Parks, both of which are incorporated herein by reference and assigned to the assignee of the present invention. When actuating means 66 is actuated to move carriages 72 and 74 together, a gripping force is applied to tubing 18 by gripper blocks 128.

Figure 20A:
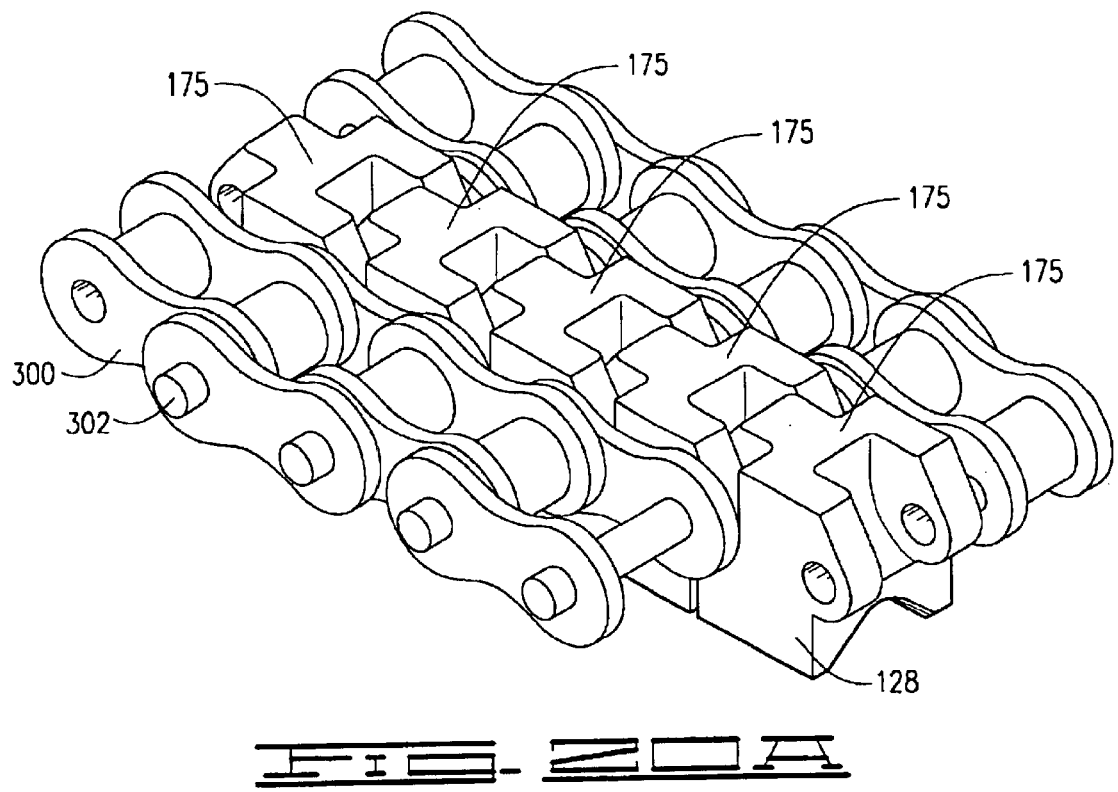
FIGS. 20A and 20B show perspective views of a portion of the chain of the present invention.
Figure 20B:
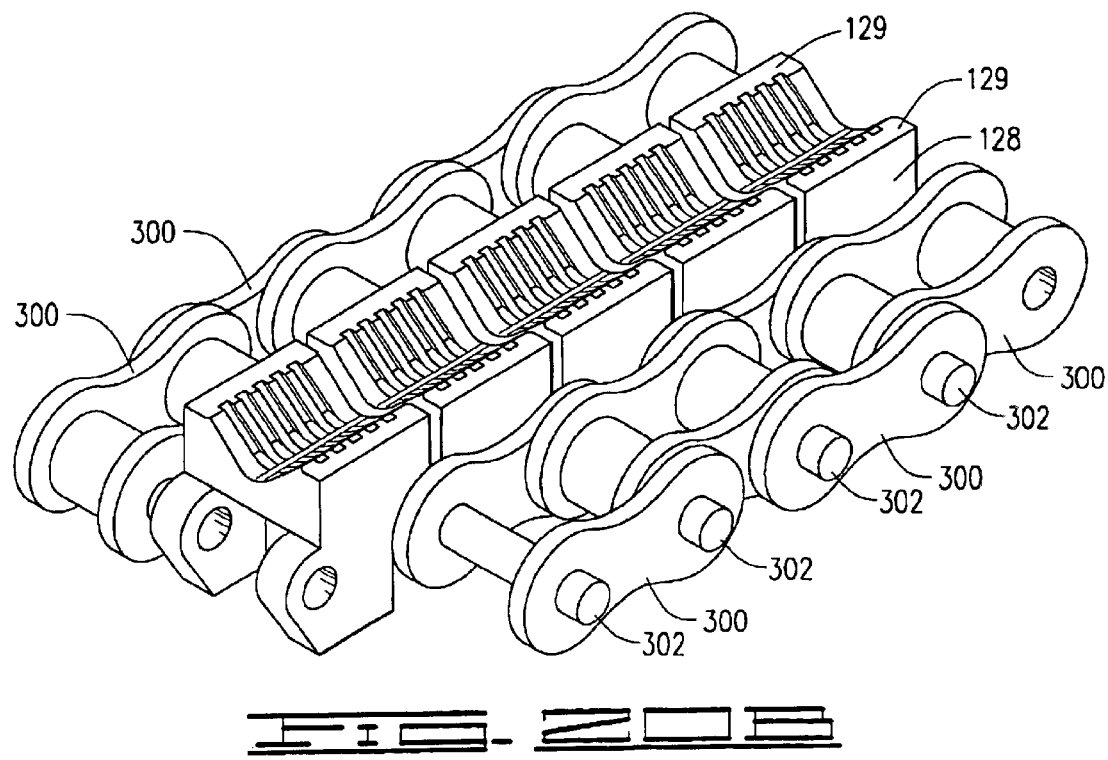

As schematically shown in FIG. 20B, gripper blocks 128 have an inner face 129 defining an inner profile. The gripper blocks 128 will contact outer diameter 22 of tubing 18 on both sides of longitudinal central axis 20.

Figure 18:
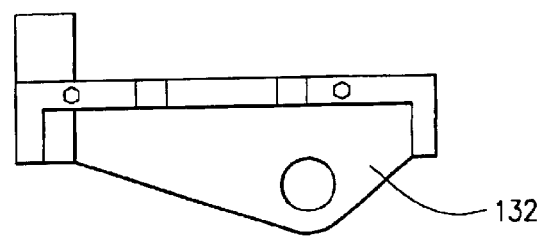
FIGS. 18 and 19 show detailed views of the carriage lug of the present invention.
Figure 19:
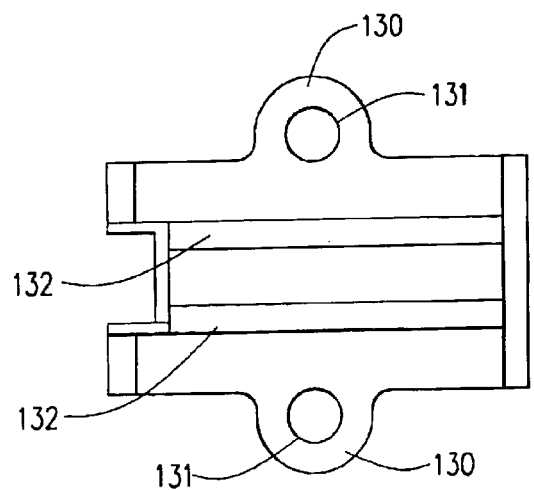

As set forth herein, carriage lug 50 is rigidly mounted to and extends downwardly from each carriage 72 and 74. As shown in FIGS. 18 and 19, each carriage lug 50 has a pair of ears 130 extending outwardly therefrom. Ears 130 have openings 131 defined therein. Carriage lugs 50 each include a pair of spaced carriage mounting lugs 132.

Figure 24:
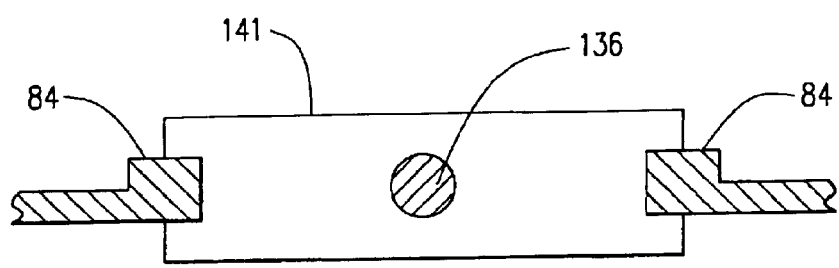
FIG. 24 is a view from line 24—24 of FIG. 4.

Tensioners 124 provide for the adjustment of the position of idler sprocket shafts 122 so that the proper tension on gripper chains 126 may be maintained, and so that the proper distance, and parallel relationship between idler sprocket shafts 122 and drive sprocket shafts 112 may be maintained. Tensioner 124 includes a bearing portion 134 and has a tensioning shaft 136 mounted to and extending downwardly from bearing portion 134. Idler sprocket shafts 122 are mounted in bearing portion 134. Tensioning shafts 136 have an upper end 135 that is connected to a mounting lug 137 positioned in an opening 138 in bearing portion 134. Tensioning shafts 136 extend through openings 131 in the ears 130 on carriage lug 50. A spring 140 is disposed around the tensioning shaft 136 below ears 130. Spring 140 may extend upwardly through openings 131 in ears 130 and be captured by a guide sub 141, which is slotted to receive and move along bosses 84 and 94 on outer plates 76 and 78, respectively, as shown in FIG. 24. The position of idler sprocket shaft 122, and thus the tension in gripper chain 126, can be adjusted simply by rotating a nut 142 on the threaded end of tensioning shaft 136. Guide sub 141 may be fixed to ear 130 so that rotation of nut 142 will move the end of the idler sprocket shaft 122 to which the tensioning shaft 136 is connected.

Figure 25:
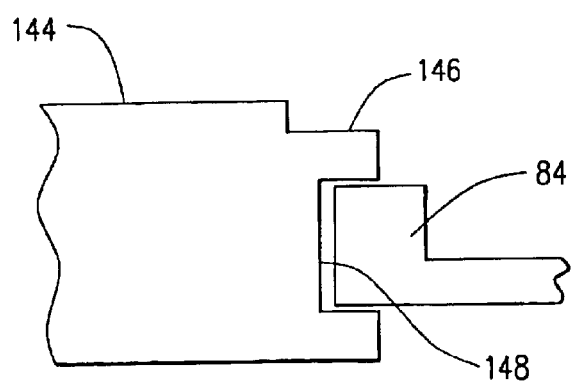
FIG. 25 is a view from line 25—25 of FIG. 2.

Bearing portion 134 may comprise a circular boss 144 having a shoulder 146 extending therefrom as shown in FIG. 25. Shoulder 146 has a groove 148 therein. Boss 84 on first outer plate 76 is received in groove 148. Likewise, boss 94 on second outer plate 78 is received in groove 148. Thus, bearing portion 134, and idler sprocket shaft 122, which is mounted therein can be vertically adjusted while lateral movement of the idler sprocket shaft 122 with respect to outer plates 76 and 78 is restricted. Shoulder 146 has a lower edge 149. Drive sprocket shaft 112 has ends that may be referred to as first and second ends 112a and 112b. Likewise, idler sprocket shaft 122 has first end 122a and second end 122b. Bearing portions 134 may therefore be referred to as first and second housings 134, in which first and second ends 122a and 122b, respectively, are mounted. Ends 112a and 122a are those at the front, or forward side 68 of injector 10 while ends 112b and 122b are those at the back, or rear side 70 of injector 10. Centerlines 113 and 119 have distances D1 and D2 therebetween at the ends 112a and 122a on carriages 72 and 74, respectively. Centerlines 113 and 119 have distances D3 and D4 therebetween at the ends 112b and 122b on carriages 72 and 74, respectively. Distances D1, D2, D3, and D4 are preferably identical and thus, centerlines 113 and 119 are preferably parallel.

Drive sprocket shafts 112 are fixed in position relative to the outer plates 76 and 78. Idler sprocket shafts 122 are vertically adjustable so that proper chain tension can be achieved. During initial installation, the distances D1–D4 are measured with, for example, a large set of vernier calipers, and the idler sprockets 120 are positioned so that distances D1–D4 are identical. During operation, however, due to the forces applied to the gripper chain 126, it is possible that the idler sprocket shafts 122 will move so that centerlines 113 and 119 are no longer in a parallel relationship. In other words, the distances D1 and D3 may no longer be identical. Likewise, the distances D1 and D3 may not be identical to distances D2 and D4. To determine whether the ends of the idler sprockets 120 move during operation, a witness mark can be placed on the outer plates 76 and 78. The witness marks may correspond to the lower edge 149 of shoulder 146 on bearing portion 134. Since the ends 122a and 122b of idler sprocket shaft 122 are fixed in the bearing portion 134, bearing portion 134 will move with the ends 122a and 122b. Thus, any movement can be detected by visually inspecting the injector 10 to determine if lower edge 149 has moved with respect to the witness mark on the outer plates 76 and 78. A scale S with a plurality of marks thereon may be attached to bosses 84 and 94 on outer plates 76 and 78 of carriages 72 and 74, respectively. The marks on each scale S can be graduated by any desired increment. The witness mark corresponding to the position of the lower edge 149 can be placed on all four scales S to note the positions of ends 122a and 122b on both of carriages 72 and 74, or can be placed on the outer plates 76 and 78 next to the scales S. The position of ends 122a and 122b can be monitored by visually checking the position of lower edge 149 to determine if it has moved from its initial position. The distances D1–D4 can continually be manipulated if changes in the positions of the centerlines 119 occur simply by rotating nut 142 so that the parallel relationship between centerlines 113 and 119 is restored and so that the distances D1–D4 are identical, or at least substantially identical. Damage to the gripper chains 126 and to other equipment due to chain misalignment can be at least minimized, by continually monitoring position of the ends 122a and 122b of the idler sprockets 120, and by moving the ends 122a and 122b, as necessary to maintain desired distances D1, D2, D3, and D4, and to maintain a parallel relationship between centerlines 113 and 119.

Figure 8:
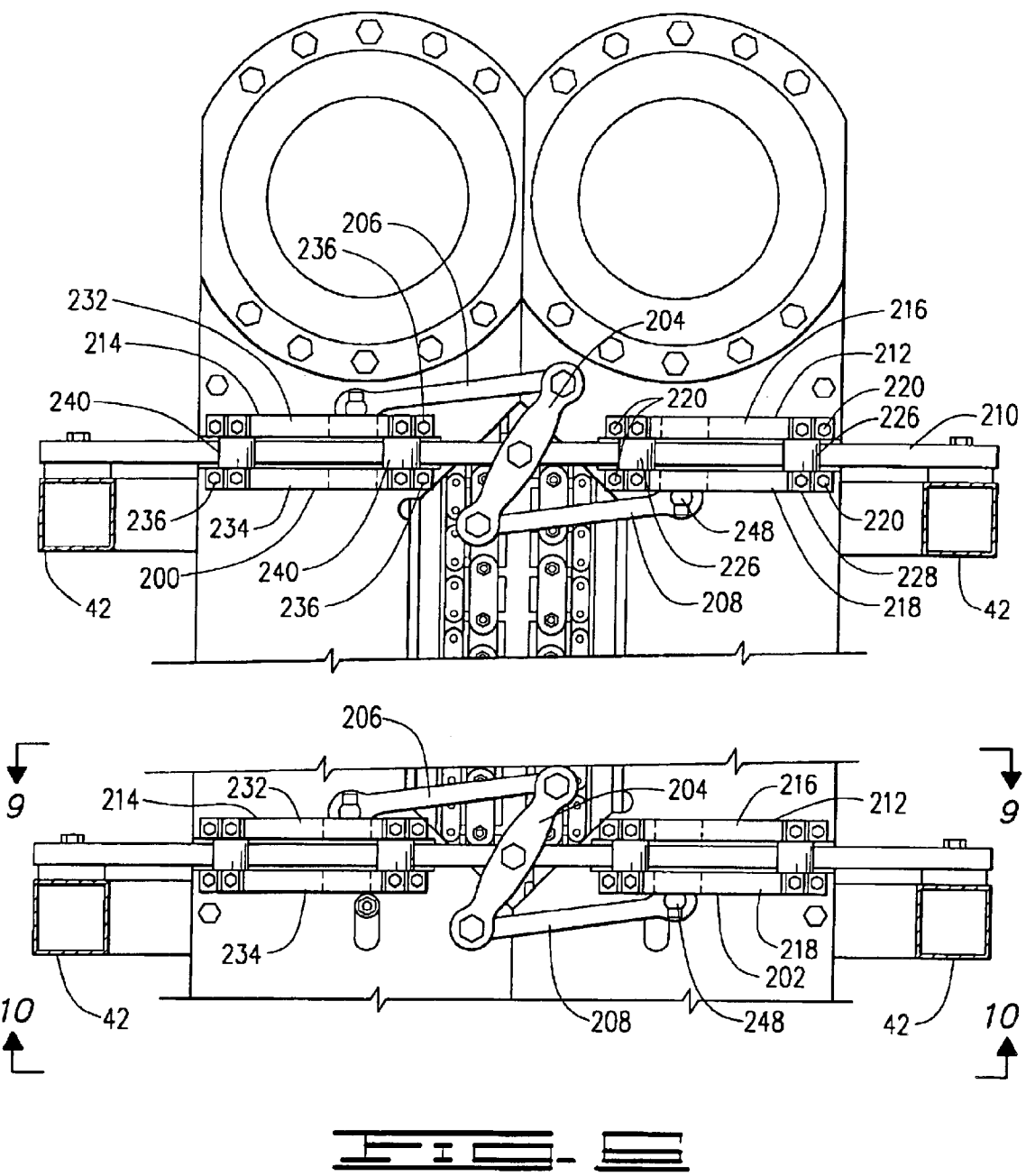
FIG. 8 shows the working or bearing face of a linear beam without the roller chain.

The roller chain drive system 108 is rigidly positioned in each carriage 46 between outer plates 76 and 78. Roller chain drive system 108 includes a linear or pressure beam 150 rigidly fixed to the outer plates 76 and 78 of the carriage 46. The linear beam 150 is shown in FIGS. 7 and 8. Linear beam 150 may be comprised of a linear beam frame 152 with a bearing plate 154 attached thereto. Bearing plate 154 has a planar face 155. Linear beam frame 152 has side webs 156 which will nest between outer plates 76 and 78 of the carriage 46, respectively. Linear beam 150 may be rigidly attached to the carriage 46 with bolts extending through outer plates 76 and 78 and side webs 156. A working length 158 is defined on the linear beam 150. Working length 158 has upper and lower ends 157 and 159, respectively. Linear beam 150 has upper and lower ends 164 and 166, respectively. A pair of spaced upper, or first roller chain sprockets 168 are rotatably disposed on upper end 164, and a pair of spaced second, or lower roller chain sprockets 170 are rotatably disposed on lower end 166 of the linear beam 150. A roller chain 172 engages upper and lower roller chain sprockets 168 and 170, respectively. Roller chain 172 is supported on planar face 155 of bearing plate 154. Roller chain 172 has an outer side 173 which will engage an inner side 175 of gripper chain 126. The roller chain sprockets 168 and 170 may be mounted on bearings 174 supported by shafts 176. Lower roller chain sprockets 170 incorporate a tensioner (not shown), of a type known in the art to keep the proper tension on roller chain 172.

Figure 23:
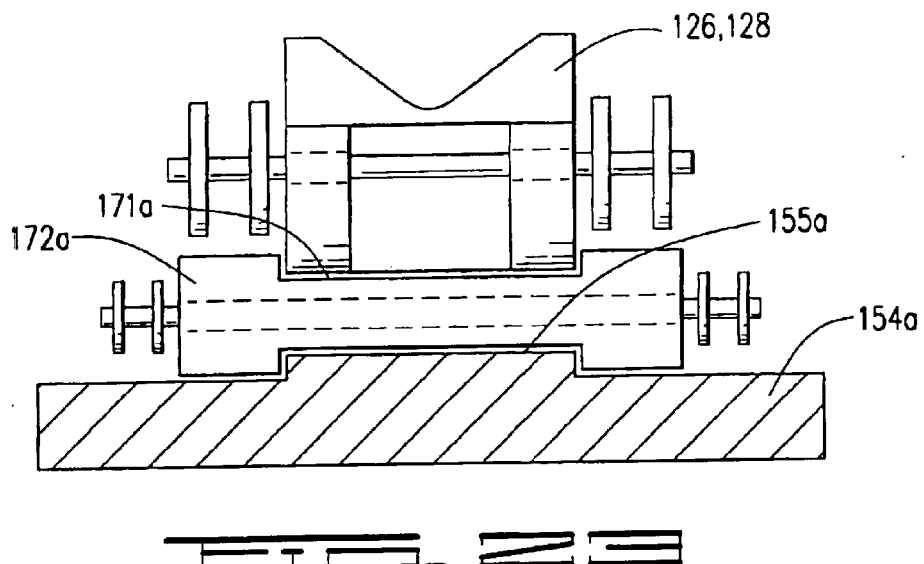
FIG. 23 is a cross section of an alternative arrangement for a linear beam face plate and roller chain.

An alternative linear beam 150 and roller chain 172 arrangement is shown in FIG. 23, which is a cross sectional view from line 23—23 on FIG. 8. As shown therein, in the alternative arrangement the linear beam 150, referred to as linear beam 150a, may have a bearing plate which will be referred to as a bearing plate 154a. Bearing plate 154a has a raised face 155a. A notched roller chain 172a is supported on raised face 155a. Raised face 155a is received in notches 171a defined in the rollers of notched roller chain 172a. Gripper blocks 128 are likewise received in notches 171a. In the alternative embodiment shown in FIG. 23, the notched roller chain 172 and the gripper chain 126 will be resistant to lateral loads since raised face 155a will prevent or at least limit the lateral movement of notched roller chain 172a. Lateral movement of gripper chain 126 is likewise resisted since gripper blocks 128 are received in notches 171a. Such an arrangement lessens the likelihood that the gripper chains 126 will become misaligned, and also lessens the likelihood of any side loading of the gripper chains 126 and the roller chains 172a.

Figure 13:
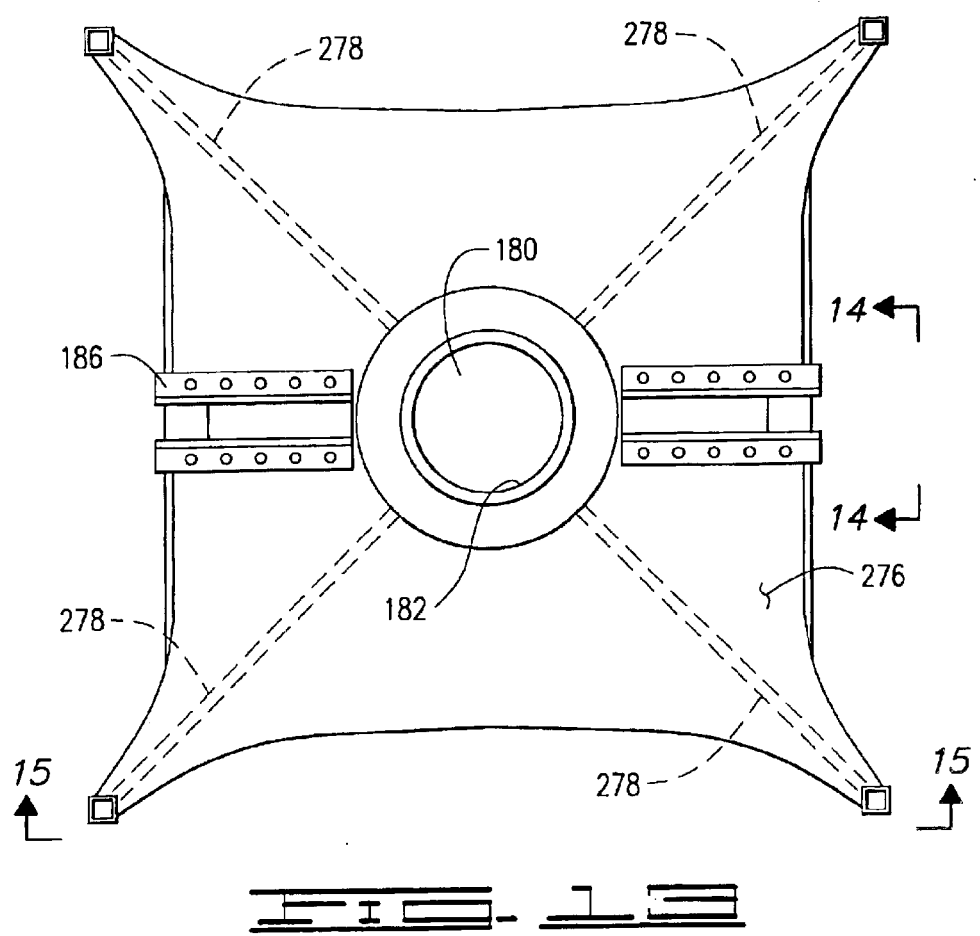
FIG. 13 shows the base of the present invention.
Figure 14:
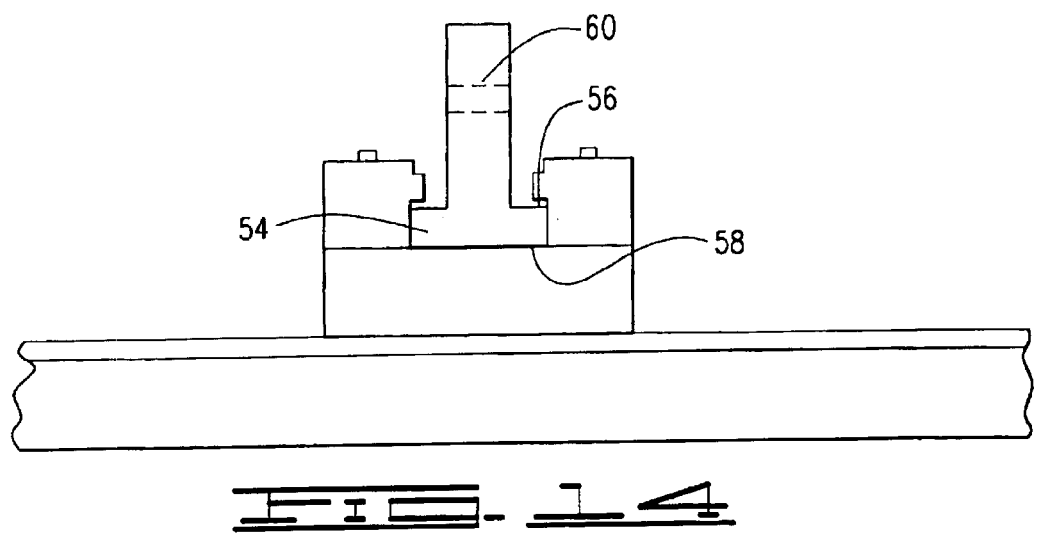
FIG. 14 shows a view from line 14—14 of FIG. 13.

As shown in FIGS. 13 and 14, attachment lugs 52 are slidably mounted to base 44. Base 44 has an opening 180 defined therein for tubing 18 to pass therethrough. As will be explained in more detail hereinbelow, opening 180 comprises a portion of a basin 182 for holding a wetting fluid. Attachment lugs 52 are slidably received in tracks 186, which are rigidly attached to base 44. Carriages 72 and 74 are thus slidable toward and away from each other to accommodate various sizes of tubing 18.

Means for moving 66 comprises a plurality of, and preferably four, hydraulic actuator cylinders 184. The injector 10 may include upper cylinders 185 and lower cylinders 188. Actuator mounting plates 190 and 192 having clevis lugs 191 and 193, respectively, extending therefrom are rigidly mounted to outer plates 76 and 78. The ends of cylinders 185 and 188 are attached to clevis lugs 191 and 193, respectively. Actuator mounting plates 190 and 192 may be attached utilizing bolts or other means known in the art which extend through the actuator mounting plates 190 and 192 and the outer plates 76 and 78 of carriages 72 and 74, respectively.

The injector 10 also includes upper and lower equalizer linkages 200 and 202, respectively, on both the front 68 and back 70 of carriages 72 and 74. Upper equalizer linkage 200 includes a center link 204, an upper outer link 206, and a lower outer link 208. Center link 204 is pivotally mounted to a laterally extending guide plate 210 which is rigidly attached at its ends to side supports 42 of frame 36. The outer ends of the upper and lower outer links 206 and 208, respectively, are mounted to slider plate assemblies 212 and 214 as better seen in FIGS. 6, 9, and 10. Slider plate assembly 212 includes an upper slider plate 216 and a lower slider plate 218. Upper and lower slider plates 216 and 218, respectively, are mounted to the carriages 72 and 74 utilizing fasteners 220. Bearings 222 are mounted on fasteners 220 between upper and lower slider plates 216 and 218, respectively, and engage an inner side 224 of guide plate 210. Slider plate assembly 212 also includes bearings 226 which are mounted between upper and lower slider plates 216 and 218, respectively, using fasteners 228. Bearings 226 engage an outer edge 230 of guide plate 210.

Slider plate assembly 214 is arranged similar to slider plate assembly 212 and thus includes upper and lower slider plates 232 and 234, respectively. Upper and lower slider plates 232 and 234, respectively, are mounted to the carriages 72 and 74 utilizing fasteners 236. Bearings 238 are mounted on fasteners 236 between upper and lower slider plates 232 and 234, respectively, and engage the inner side 224 of guide plate 210. Slider plate assembly 214 also includes bearings 240 mounted between upper and lower slider plates 232 and 234, respectively, using fasteners 242. Bearings 240 engage outer edge 230 of guide plate 210. The height of bearings 222, 226, 238, and 240 are substantially identical and is such that there is clearance between the slider plates 232 and 234 and guide plates 210. Each of the bearings 222, 226, 238, and 240 engage the sides of guide plates 210 so that when actuator cylinders 184 move carriages 72 and 74 laterally, the carriages 72 and 74 are supported by and slide along guide plates 210. Lower equalizer linkage 202 is substantially identical to upper equalizer linkage 200 and includes the components set forth above.

Figure 9:
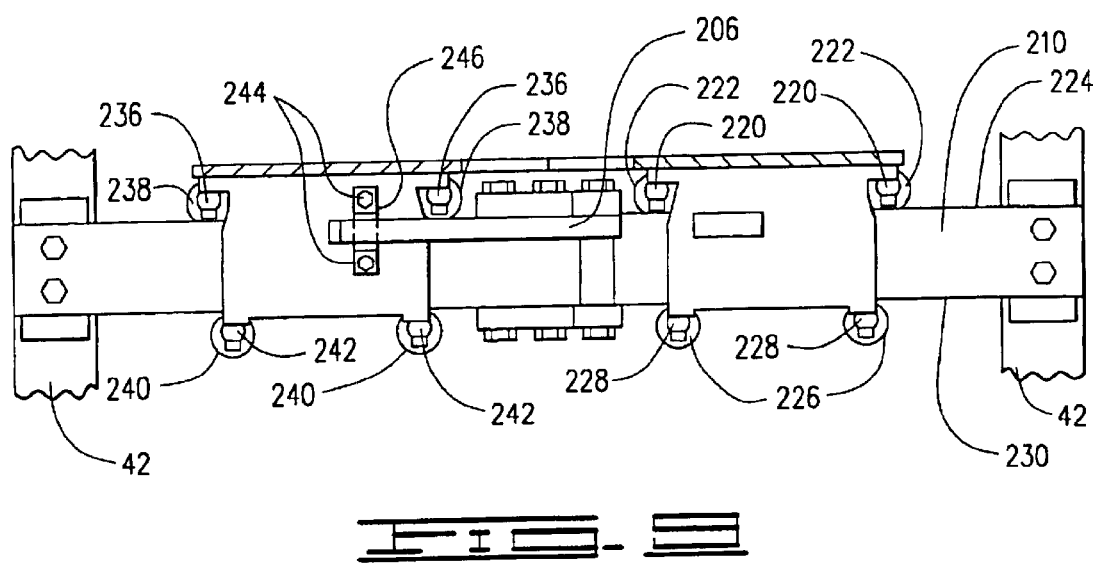
FIG. 9 shows a view taken from line 9—9 of FIG. 6.
Figure 10:
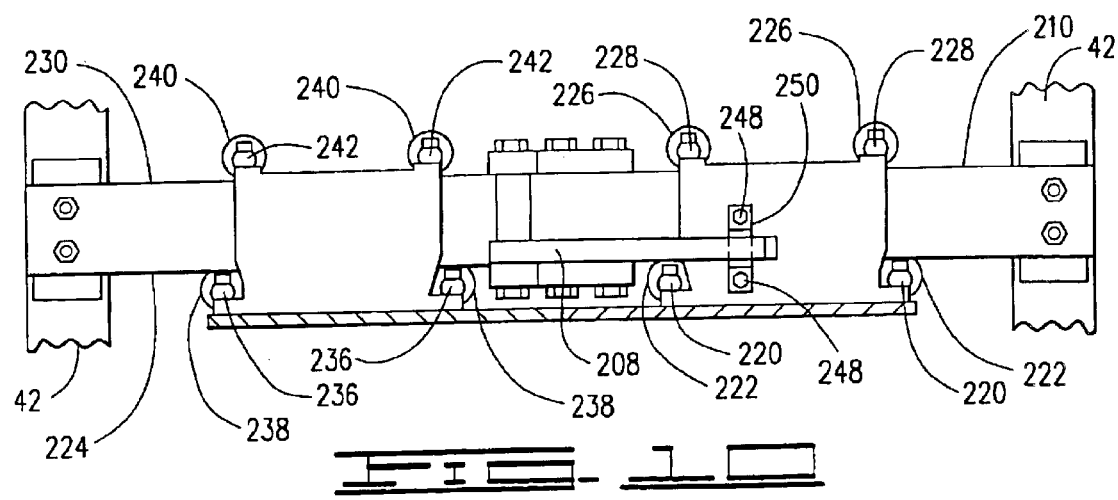
FIG. 10 shows a view taken from line 10—10 of FIG. 6.

As shown in FIGS. 9 and 10, upper outer link 206 is connected to upper slider plate 232. Upper outer link 206 is connected utilizing a pair of fasteners 244 and a pin 246 extending therebetween. Pin 246 extends through an opening in the end of upper outer link 206. In like manner, lower outer link 208 is connected utilizing a pair of fasteners 248 with a pin 250 extending therebetween through an opening in the end of lower outer link 208. Center link 204 is connected at centerline 251 of the injector 10 so that when the actuator cylinders 184 are actuated, each carriage 46 will move an equal distance away from or toward centerline 251. By utilizing upper and lower equalizer linkages 200 and 202, respectively, on both the front 68 and back 70 of carriages 72 and 74, the proper alignment of carriages 72 and 74 is maintained. The arrangement restrains carriages 72 and 74 to prevent, or at least limit, deflection that might otherwise be caused by the clamping forces applied to tubing 18.

In operation, when it is desired that tubing 18 be lowered, raised, or suspended in the well 13, actuator cylinders 184 will be actuated until gripper blocks 128 engage tubing 18. Gripper chains 126 will engage tubing 18 along working length 158 of the linear beams 150 and a corresponding working length 252 of the chain. Thus, gripper chain 126 will first contact the tubing 18 at upper end 157 of the working length 158 of linear beam 150, and the contact between the tubing 18 and gripper chains 126 will break as the tubing 18 passes lower end 159 of working length 158. As set forth previously, a gripper chain utilizing blocks of the type shown in U.S. Pat. No. 5,094,340 to Avakov is preferably utilized. Referring to FIGS. 20A and 20B, the gripper chains 126 may thus be comprised of outer links 300 and gripper blocks 128. The outer links 300 and the gripper blocks 128 are connected to form an endless chain utilizing linking pins 302 which extend through the outer links 300 and the gripper blocks 128.

When tubing 18 is engaged by gripper blocks 128, support guides 254 will also engage tubing 18. Support guides 254 are positioned so that the support guide 254 in each of carriages 72 and 74 will engage tubing 18 when gripper blocks 128 on gripper chains 126 engage tubing 18. Referring to FIGS. 21 and 22, support guides 254 have an upper end 256, a lower end 258, and define a length 260. Length 260 is sufficient to resist buckling loads that may be applied to tubing 18 as it is injected into the well 13. Support guides 254 will engage the tubing 18 at a point just below working length 252. As will be explained in more detail hereinbelow, length 260 is such that support guide 254 extends from just below the point where tubing 18 is disengaged from gripper chains 126 downwardly into basin 182 so that it extends downwardly to almost a lower end of the base 44. Support guide 254 comprises a slide or guide element 262 having a face 263 mounted in a support guide housing 264. Support guide housing 264 may be generally semi-cylindrical in shape, and may have grooves 265 defined therein for receiving ridges 267 defined by slide 262, to mount slide 262 in support guide housing 264. Slide 262 has an inner profile 266 that preferably matches the inner profile of gripper blocks 128 used in gripper chain 126. Slide 262 is preferably comprised of an ultrahigh molecular weight plastic material, and is preferably a polyethylene slide 262 so that when tubing 18 is engaged by support guide 254, tubing 18 will be supported but will slide through support guides 254. A mounting bracket 268 may be utilized to attach support guides 254 to outer plates 76 and 78 of carriages 72 and 74. A pair of mounting brackets 268 may be utilized with each carriage 72 and 74. Each mounting bracket 268 has a side flange 270 and a forward flange 272. Forward flange 272 will extend from side flange 270 inwardly to define a retaining flange 273 that covers face 263 of slide 262. Mounting blocks 274 may be positioned between outer plates 76 and 78 and bolts may be utilized to extend through the outer plates 76 and 78 and mounting blocks 274 to hold mounting brackets 268 in place which in turn holds support guides 254 in place.

Figure 15:
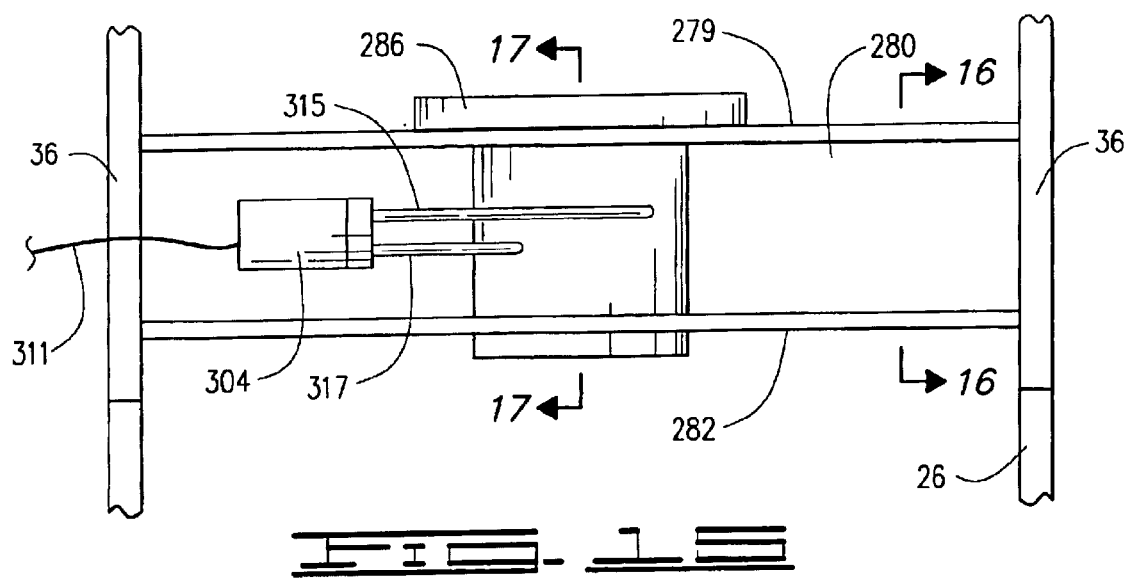
FIG. 15 shows a view from line 15—15 of FIG. 13.
Figure 16:
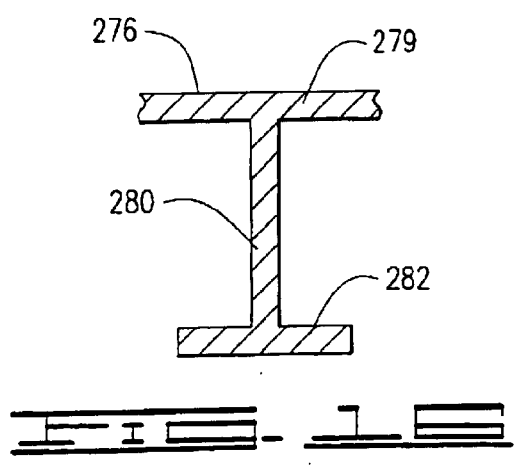
FIG. 16 shows a view from line 16—16 of FIG. 15.
Figure 17:
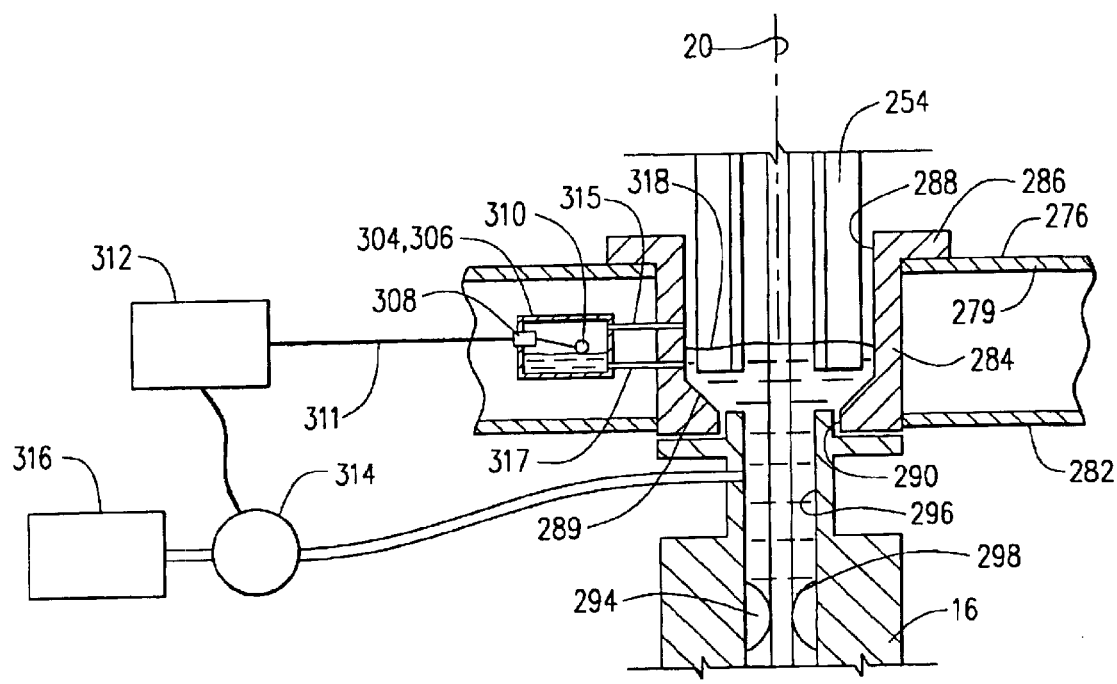
FIG. 17 shows a view from line 17—17 of FIG. 15.

Referring now to FIG. 13, base 44 has an upper surface 276 and comprises four legs 278 extending outwardly from opening 180. As shown in FIGS. 15–17, the base 44 may have a generally I-shaped cross section with upper flanges 279, central web 280, and lower flanges 282. A sleeve 284 comprises a portion of base 44 and may be attached by welding or any means known in the art. Sleeve 284 has an upper flange 286 and defines opening 180. Opening 180 defines a first inner diameter 288. Sleeve 284 may have an inwardly extending flange 289 defining a second inner diameter 290. FIG. 17 schematically shows in cross section stuffing box 16 which may be a stripper/packer or other type of stuffing box known in the art. A seal, or pack-off element 294 is disposed in stuffing box 16 to sealingly engage the tubing 18 passing therethrough.

Basin 182 is defined by opening 180 and by opening 296 in stuffing box 16. The lower end 298 of basin 182 is defined at pack-off element 294. Basin 182 holds a wetting fluid. Tubing 18 must pass through basin 182 and thus through the wetting fluid. As is apparent, a uniform application of the wetting fluid will be applied which will aid in the injection of tubing 18 through stuffing box 16 and other portions of wellhead 12 into the well 13 therebelow. A uniform application of the wetting fluid will improve the life of tubing 18 and pack-off element 294, and in addition provides for a much easier application of wetting fluid than any prior art method.

Injector 10 may further include a means for maintaining the fluid level in the basin 182. Means for maintaining the fluid level in the basin 182 may comprise a float valve 304 which is schematically shown in FIGS. 15 and 17. Float valve 304 may comprise a housing 306 containing a float switch 308 connected to a float 310. Float switch 308 is electrically connected by wires 311 to a controller 312 which is in turn electrically connected to a pump 314. Pump 314 is connected to a wetting fluid reservoir 316. Float valve 304 is in fluid communication with basin 182 through upper and lower hoses 315 and 317, respectively. When a level 318 in housing 306, which as is understood will be equal to a level 318 in basin 182, falls to a desired predetermined lower level, in this case the level at which lower tube 317 is positioned in basin 182, float switch 308 will be actuated which will in turn actuate pump 314. Pump 314 will then pump wetting fluid from reservoir 316 into basin 182 via a flow line until a desired upper level is reached, in this case the level at which upper hose 315 is positioned in basin 182, at which time float switch 308 will automatically shut off, which will in turn automatically shut off pump 314. In this manner, level 318 in basin 182 can be maintained between a desired upper level and a desired lower level. The lower ends 258 of support guides 254 are shown in FIG. 17 and as explained previously, length 260 of support guides 254 is such that lower ends 258 are positioned at or near the lower end of opening 180 defined in base 44. Thus, support guides 254 extend substantially from the lower end of working length 252 to a bottom, or lower end of base 44.

It is understood that the foregoing description of the invention and illustrative drawings which accompany the same are presented by way of explanation only and that changes may be made by those skilled in the art without departing from the true spirit of this invention.

What is claimed is:

1. A coiled tubing injector apparatus comprising:

a base;

first and second carriages extending upwardly from the base, wherein each carriage has first and second outer plates, and at least one of the first and second carriages is movable laterally with respect to the base; and a gripper chain system mounted to the first and second outer plates of each carriage, wherein the gripper chain system comprises:

a pair of spaced gripper chain drive sprockets mounted on a drive sprocket shaft for supporting a gripper chain, wherein the gripper chain is adapted to engage coiled tubing, and the drive sprocket shaft has a centerline corresponding to an axis of rotation of the drive sprockets; and a pair of spaced idler sprockets mounted on an idler sprocket shaft positioned below the gripper chain drive sprockets for supporting the gripper chain, wherein the idler sprocket shaft has a centerline corresponding to an axis of rotation of the idler sprockets, and the centerlines of the drive sprocket shaft and the idler sprocket shaft have a first distance therebetween at first ends of the drive sprocket shaft and idler sprocket shaft and a second distance therebetween at second ends of the drive sprocket shaft and idler sprocket shaft;

wherein:

the first and second distances are initially substantially identical so that the centerlines of the drive sprocket shaft and the idler sprocket shaft are parallel;

the initial substantially identical first and second distances are established by noting the position of the first and second ends of the idler sprocket shaft relative to witness marks on the first and second outer plates; and the position of the first and second ends of the idler sprocket shaft can be adjusted to maintain a parallel relationship between the centerlines of the drive sprocket shaft and the idler sprocket shaft if the position of the first or second end of the idler sprocket shaft moves during operation.

2. The coiled tubing injector apparatus of claim 1 wherein the first and second carriages are movable laterally with respect to the base.

3. The coiled tubing injector apparatus of claim 1 wherein:

the first and second ends of the idler sprocket shafts are mounted in first and second housings; and the position of the first and second ends of the idler sprocket shafts can be monitored by checking the position of the first and second housings relative to the witness marks on the first and second outer plates.

4. The coiled tubing injector apparatus of claim 3 further comprising a scale fixed to the first and second outer plates, wherein:

the initial position of the first and second ends of the idler sprocket shaft can be determined relative to the scale; and the amount of any movement of the position of the first and second ends of the idler sprocket shaft can be determined by monitoring the position of the first and second housings relative to the scale.

5. The coiled tubing injection apparatus of claim 4 wherein the scale is graduated, so that the amount of movement of the first and second ends is detectable, and so that the first and second ends can be moved the same distance to adjust a tension in the gripper chain and maintain a parallel relationship between the centerlines of the drive sprocket shaft and the idler sprocket shaft.

6. The coiled tubing injector apparatus of claim 1 further comprising a wetting fluid basin for holding a wetting fluid, wherein the wetting fluid basin is positioned below the gripper chains so that the coiled tubing passes through the wetting fluid basin.

7. A method for maintaining a substantially parallel relationship between a drive sprocket axis of rotation and an idler sprocket axis of rotation in a coiled tubing injector, wherein the coiled tubing injector comprises first and second outer plates having a pair of drive sprockets and idler sprockets located therebetween, the drive sprockets are mounted on a drive sprocket shaft, the drive sprocket shaft has a centerline collinear with the drive sprocket axis of rotation, the idler sprockets are mounted on an idler sprocket shaft, and the idler sprocket shaft has a centerline collinear with the idler sprocket axis of rotation, wherein a gripper chain is supported on the drive sprockets and idler sprockets, the method comprising the steps of:

fixing the position of the drive sprocket shaft with respect to the first and second outer plates;

positioning the idler sprocket shaft so that the centerline of the idler sprocket shaft is parallel to the centerline of the drive sprocket shaft and so that an initial distance between first and second ends, respectively, of the drive sprocket shaft and the idler sprocket shaft, is at a desired distance;

placing a witness mark on the first and second outer plates to mark the position of first and second ends of the idler sprocket shaft relative to the first and second outer plates;

monitoring the position of the first and second ends of the idler sprocket shaft relative to the witness marks; and adjusting the position of the idler sprocket shaft to maintain the parallel relationship between the idler sprocket shaft centerline and the drive sprocket shaft centerline if the first or second end of the idler sprocket shaft moves relative to the witness mark.

8. The method of claim 7 further comprising the steps of:

attaching scales to the first and second outer plates, wherein each scale has a plurality of marks thereon; and measuring the amount of movement of the first and second ends of the idler sprocket shaft on the scales;

wherein the adjusting step further comprises the step of moving the first and second ends of the idler sprocket shaft to maintain the parallel relationship based on the measured amount of movement.

9. The method of claim 8 further comprising the step of adjusting the tension in the gripper chain supported by the drive and idler sprockets.

10. The method of claim 8 wherein the measuring step further comprises the step of measuring the amount of movement of first and second housings in which the first and second ends of the idler sprocket shaft are mounted.

11. The method of claim 8 wherein the adjusting step is performed while the gripper chains are stationary.

12. The method of claim 8 further comprising the step of repeating the measuring and adjusting steps as necessary to maintain the parallel relationship.

* * * * *